United States Patent [19]

Walts

[11] Patent Number: 5,684,287
[45] Date of Patent: Nov. 4, 1997

[54] BAR CODE SCANNER WITH TACTILE/ VIBRATORY SIGNALING MEANS

[75] Inventor: Robert H. Walts, Rochester, N.Y.

[73] Assignee: PSC Inc., Webster, N.Y.

[21] Appl. No.: 419,240

[22] Filed: Apr. 10, 1995

[51] Int. Cl.⁶ ........................................ G06K 7/10
[52] U.S. Cl. .............................. 235/462; 235/454
[58] Field of Search ................... 235/472, 462, 235/454

[56] References Cited

U.S. PATENT DOCUMENTS

| | | | |
|---|---|---|---|
| 4,593,186 | 6/1986 | Swartz et al. | 235/472 |
| 5,019,698 | 5/1991 | Eastman | 235/462 |
| 5,200,597 | 4/1993 | Eastman et al. | 235/455 |
| 5,212,371 | 5/1993 | Boles et al. | 225/472 |
| 5,221,838 | 6/1993 | Gutman | 235/379 |
| 5,237,161 | 8/1993 | Grodevant | 235/462 |
| 5,250,790 | 10/1993 | Melitsky et al. | 235/462 |
| 5,250,792 | 10/1993 | Swartz et al. | 235/472 |
| 5,258,604 | 11/1993 | Behrens et al. | 235/462 |
| 5,272,475 | 12/1993 | Eaton | 340/825.44 |
| 5,288,985 | 2/1994 | Chadima | 235/472 |
| 5,340,972 | 8/1994 | Sandor | 235/472 |
| 5,380,994 | 1/1995 | Ray | 235/472 |

*Primary Examiner*—Donald T. Hajec
*Assistant Examiner*—Karl Frech
*Attorney, Agent, or Firm*—Foley & Lardner

[57] ABSTRACT

A hand held bar code scanning device having a tactile feature in which the hand held device vibrates upon indication of a successful bar code scan. The bar code scanning device includes a scanning circuit, which outputs an acknowledge signal that indicates a successful scan. This acknowledge signal is received by a switch, which closes when the acknowledge signal is in an active state. The input of the switch is connected to a reference potential, and the output of the switch is connected to a vibration motor. When the switch closes, the reference potential is applied to the vibration motor, thereby causing the hand held bar code scanning device to vibrate. This vibration notifies the hand held operator of a successful scan.

3 Claims, 9 Drawing Sheets

3,684,287

BAR CODE SCANNER WITH TACTILE/ VIBRATORY SIGNALING MEANS

BACKGROUND OF THE INVENTION

1. Field of the Invention

The invention relates to a hand held bar code scanning device. More specifically, the invention relates to a hand held bar code scanning device with a tactile vibration to signify a successful bar code scan.

2. Description of the Related Art

Bar code reading instruments are used in a wide variety of applications. For example, bar code reading instruments are used to read universal product code (UPC) information off of products in supermarkets and department stores, and are also used for inventory control.

FIG. 1 illustrates a conventional bar code reading instrument in the form of a scan gun 100. The scan gun 100 generates a beam of light which exits from the scan gun 100 via a window 10. The beam reflects off of the bar code being read, and the reflected beam is received in the scan gun through the window 10. The operator initiates the scanning process by depressing a mechanical trigger 20. When the mechanical trigger 20 is depressed, it pivots around a pivot point 30 and a lever arm thereof activates a switch 40, which in turn sends an electrical trigger signal to a scanning circuit 50.

When the scanning circuit 50 has successfully scanned the bar code, an acknowledgement, or scan complete signal is sent from the scanning circuit 50 to an audio circuit 60, which outputs an audible tone to inform the operator of a successful bar code scan. When the operator hears the audible tone, the operator can proceed to the next device to be scanned by the scan gun 100. In a similar manner, the acknowledgement signal is sent to a light-emitting diode (LED), or the like, so that a visible indication of a successful scan is thereby indicated by the turning on of the LED.

The detailed design of bar code reading instruments is described in United States patent application Ser. No. 08/291,839, filed Aug. 17, 1994 by Chay La, and entitled "Non-Contact Actuated Trigger Apparatus for Bar Code Laser Scanner"; U.S. Pat. No. 5,258,604, which was issued to James Behrens et al. on Nov. 2, 1993, and is entitled "Bar Code Scanner"; U.S. Pat. No. 5,237,161, which was issued to Scott R. Grodevant on Aug. 17, 1993 and is entitled "System for Automatically Reading Symbols, Such as Bar Codes, on Objects Which are Placed in the Detection Zone of a Symbol Reading Unit, Such as a Bar Code Scanner"; U.S. Pat. No. 5,212,371, which was issued to John A. Boles et al. on May 18, 1993 and is entitled "Hand Held Bar Code Scanner with Improved Aiming Means"; U.S. Pat. No. 5,200,597, which was issued to Jay M. Eastman et al. on Apr. 6, 1993 and is entitled "Digitally Controlled System for Scanning and Reading Bar Codes"; and U.S. Pat. No. 5,019,698, which was issued to Jay M. Eastman et al. on May 28, 1991 and is entitled "Bar Code Reading System Having Electrical Power Conservation and Laser Radiation Power Limiting Means." The entire contents of all of the patents and the patent application listed above are incorporated herein by reference. This application and the above-identified patent applications and patents are owned by PSC Inc. (Webster, N.Y.).

U.S. Pat. No. 5,250,790, which was issued to Boris Melitsky et al. on Oct. 5, 1993, entitled "Hand-Mounted Scanner with Automatic Manual Initiation of Reading Indicia"; U.S. Pat. No. 5,250,792, which was issued to Jerome Swartz et al. on Oct. 5, 1993, entitled "Portable Laser Diode Scanning Head"; and U.S. Pat. No. 4,593,186, which was issued to Jerome Swartz on Jun. 3, 1986, entitled "Portable Laser Scanning System and Scanning Methods," all assigned to Symbol Technologies, Inc. (Bohemia, N.Y.), disclose other conventional scanners.

A problem exists with conventional bar code scanners in that the operator of the scan gun may not hear the audible tone that designates a successful scan when there is a large amount of background noise in the area where the scanning takes place, or when the operator has poor hearing ability. Further, conventional bar code scanners that emit a light pulse signifying a successful bar code scan may not be easily noticed by an operator when the scanning is performed under brightly lit conditions, or when the operator has poor eyesight.

SUMMARY OF THE INVENTION

It is therefore an object of the invention to provide a hand held bar code scanner that vibrates when a successful bar code scan has taken place, thereby allowing the operator to detect a successful scan in brightly lit areas or in noisy areas.

According to one aspect of the invention, there is provided a scanning device which includes a housing unit, a scanning circuit for scanning an object with a bar code, a circuit for outputting a signal signifying when the scanning circuit has successfully scanned the object, and a vibration circuit for creating a tactile vibration in response to the signal.

Other objects, features and advantages of the invention will be apparent from the detailed description of preferred embodiments as set forth below.

BRIEF DESCRIPTION OF THE DRAWINGS

Specific embodiments of the invention will be described below with reference to the accompanying drawings, wherein.

DETAILED DESCRIPTION OF THE PREFERRED EMBODIMENTS

Figure 2:
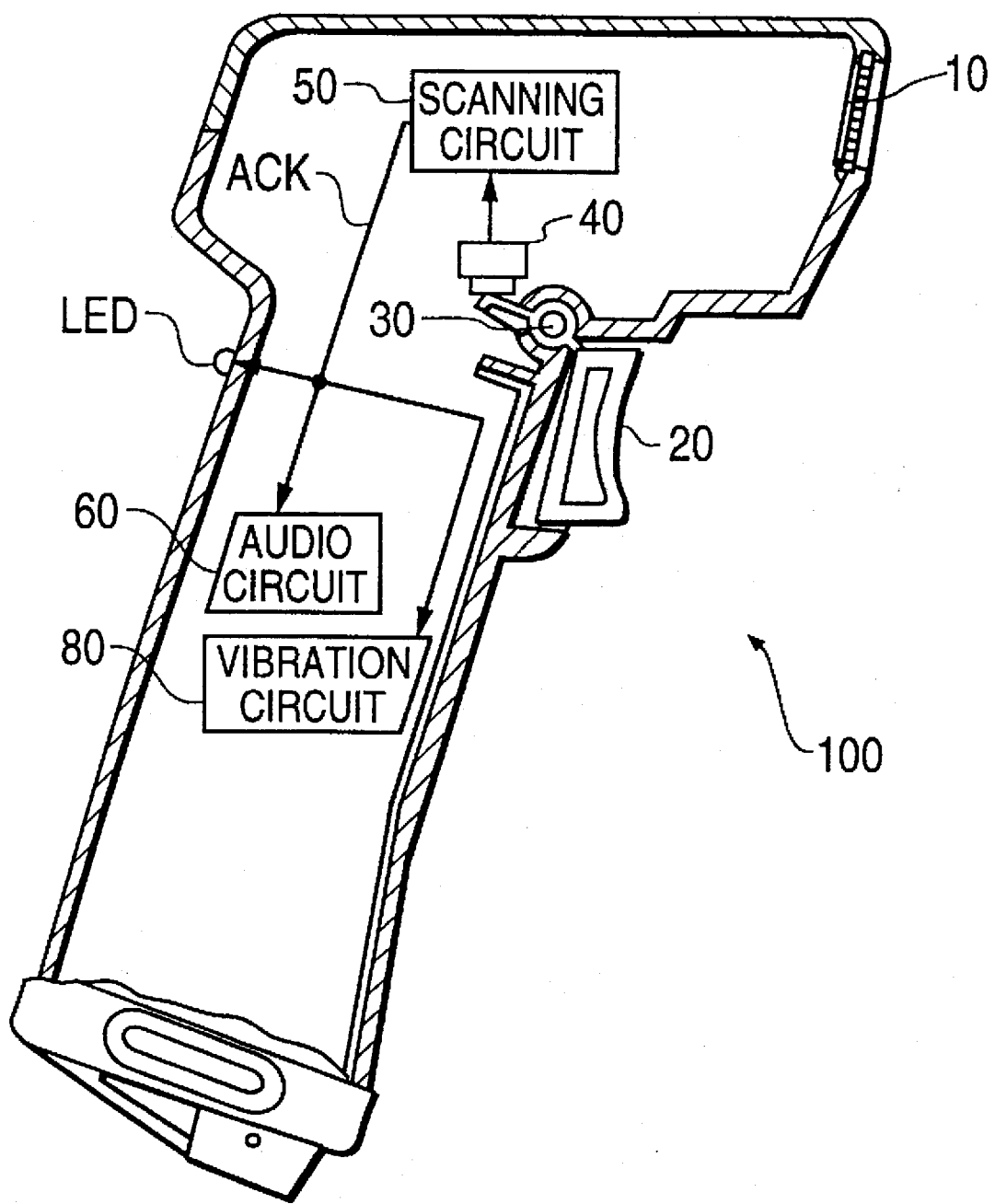
FIG. 2 illustrates a scan gun with a vibration circuit according to the invention.

FIG. 2 illustrates a vibration circuit 80 incorporated into a scan gun according to the invention. The vibration circuit 80 is connected to the scanning circuit 50, and receives a signal from the scanning circuit 50 indicating whether or not a scan has been successful. The vibration circuit 80 may also receive an enable and/or a disable signal from the scanning circuit 50, as will be explained later.

Figure 1:
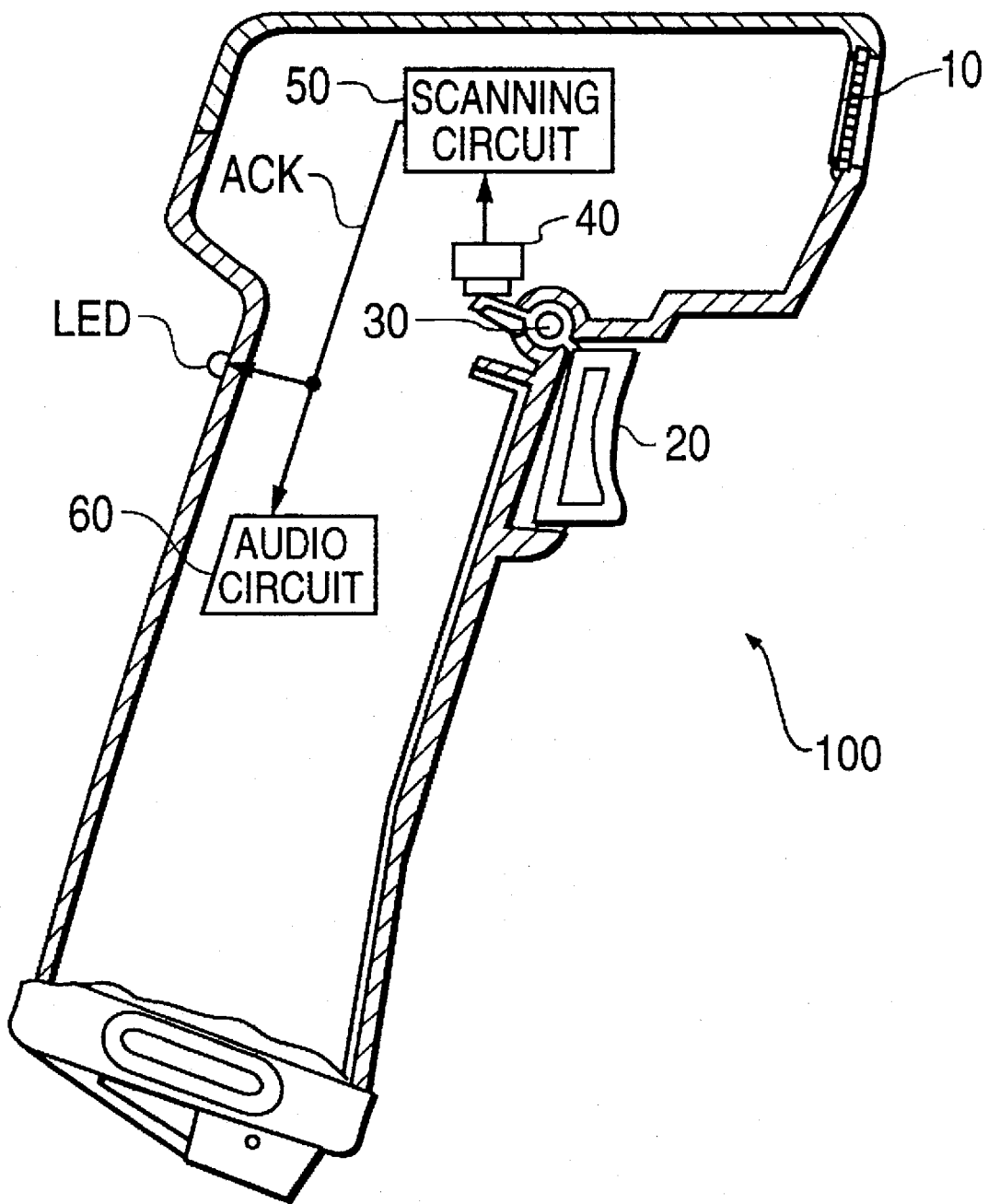
FIG. 1 illustrates a conventional scan gun.
Figure 3:
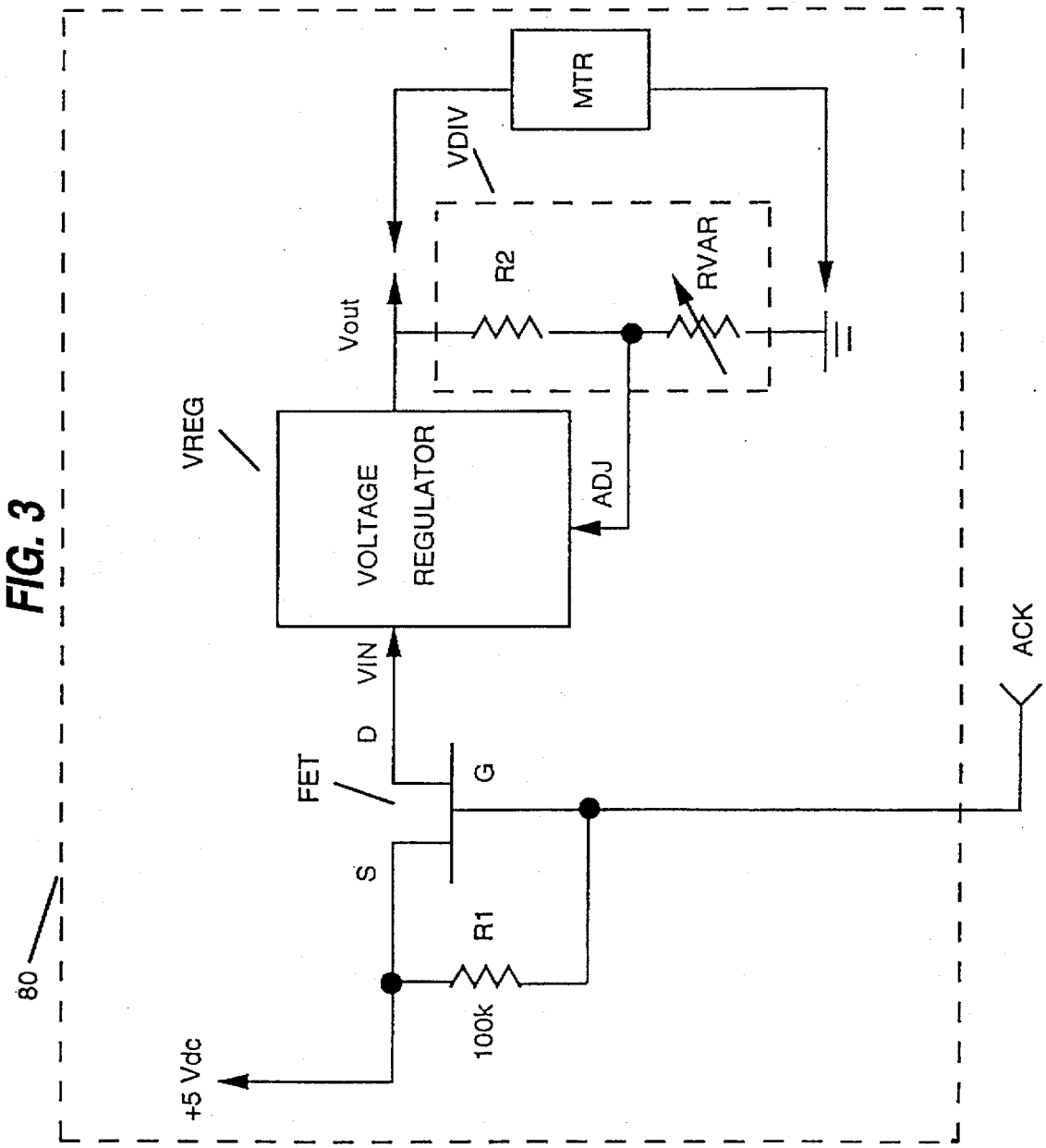
FIG. 3 illustrates a vibration circuit used in a scan gun according to a first embodiment of the invention.

FIG. 3 gives a detailed diagram of the vibration circuit 80 used in a scan gun according to a first embodiment of the invention. This embodiment employs a tactile vibration circuit 80 utilizing a voltage regulator VREG. Referring back to FIG. 1, when the scanning circuit 50 has successfully completed a scan of a bar code on an object, the scanning circuit 50 outputs a pulse (or a series of sequential pulses) on an acknowledge line ACK. This acknowledge line ACK is used in conventional bar code scanners to output a sound, such as a beep, or to activate a light-emitting diode or the like on the bar code scanner whenever the pulse is detected, thereby signifying a "good read", and allowing the operator to proceed to the next device to be scanned.

However, in noisy environments and/or in brightly lit environments, these methods of giving notification of a successful scan may be insufficient, resulting in multiple scans of an object that had been successfully scanned earlier, but where the operator did not see and/or hear the "good read" confirmation signal.

In view of this, the invention is directed to a tactile bar code scanner in which, when a bar code scan is successful, the operator feels a tactile vibration of the bar code scanner, thereby indicating that the operator can move on to scan the next device (if any). Referring again to FIG. 3, the acknowledgement line ACK is received from the scanning circuit 50 to a gate of a field effect transistor FET. In the first embodiment, the field effect transistor FET is shown as a model MTD4P05. The acknowledge line ACK is also connected to the source of the field effect transistor FET after first passing through a resistor R1. In the first embodiment, the resistor R1 has a resistance of 100 kohms, but it can be set to any other appropriate resistance as is known to one of ordinary skill in the art.

The source of the field effect transistor FET is also connected to a power supply voltage, Vdc, which in the first embodiment is shown as equal to +5 volts DC. The reception of a "high", or active state on the acknowledge line ACK acts to turn ON the field effect transistor FET. In essence, the field effect transistor FET acts as a switch, whereby the voltage at the source of the field effect transistor FET is passed through to a drain of the field effect transistor FET at instances in time when the acknowledge line ACK is in a "high", or active state. At all other times, the field effect transistor FET is in an OFF mode.

Of course, other switching devices can be used instead of the field effect transistor FET and still be within the scope of the invention, as long as these devices allow a voltage at the input of the switch circuit to pass through to the output of the switch circuit in response to the acknowledge line ACK being in an active state. For example, the active state may be a low, or "0", value, in which case the switch circuit would only be turned on when this low value is received on the acknowledge line ACK. Depending upon whether the acknowledge line ACK is an active low or an active high line, the FET can be selected as either a p-type device or an n-type device. That way, the FET will only be in the ON state when the acknowledge line ACK is in its active state.

The voltage output from the drain of the field effect transistor FET when the acknowledge line ACK is in an active state is then received at an input of a voltage regulator VREG. In the first embodiment, the voltage regulator VREG is shown as a model LM317. The output of the voltage regulator VREG is a regulated voltage $V_{out}$, which is sent directly to a vibrating motor MTR. In the first embodiment, the vibrating motor MTR is a model 7CE-1701WL-00, manufactured by NAMIKI.

The vibrating motor MTR acts to cause a tactile vibration in the bar code scanner 100 whenever it receives the regulated voltage $V_{out}$ from the voltage regulator VREG. The vibrating motor MTR is connected between a low voltage potential, such as "ground", and the output of the voltage regulator VREG. At all times in which the acknowledge line ACK is not in an "active" state, the output $V_{out}$ of the voltage regulator VREG is at a low voltage potential (i.e., zero volts), and so the vibrating motor MTR is not activated. Therefore, a tactile vibration is only felt by the operator when the acknowledge line ACK is in an active state. In this case, a hearing-impaired and/or sight-impaired operator can be effectively notified of a successful bar code scan.

The output of the voltage regulator VREG is connected to a voltage divider circuit VDIV, which is shown in the first embodiment as a second resistor R2 in series with a variable resistor RVAR. In the first embodiment, the second resistor R2 has a value of 500 kohms, and the variable resistor RVAR has a resistance of 3 kohms. The variable resistor RVAR is set to a predetermined resistance value to ensure that a proper voltage level $V_{out}$ is received by the vibrating motor MTR. That is, a point A between the second resistor R2 and the variable resistor RVAR is connected to an adjustment input ADJ of the voltage regulator VREG, thereby allowing for control of an appropriate amount of voltage to be output from the voltage regulator VREG to one end of the vibrating motor MTR. By varying the variable resistor RVAR, the amount of regulated voltage $V_{out}$ can be controlled in a precise manner.

In the first embodiment as shown in FIG. 3, a simple and inexpensive circuit is utilized to create a tactile vibration to allow for an operator to be notified of a successful bar code scan in noisy environments. Of course, this tactile vibration system can be used together with either an audible indication system (such as a beep sound), or a visible indication system (such as an LED on the bar code scanner), or both, and still be within the scope of the invention as described herein.

Figure 4:
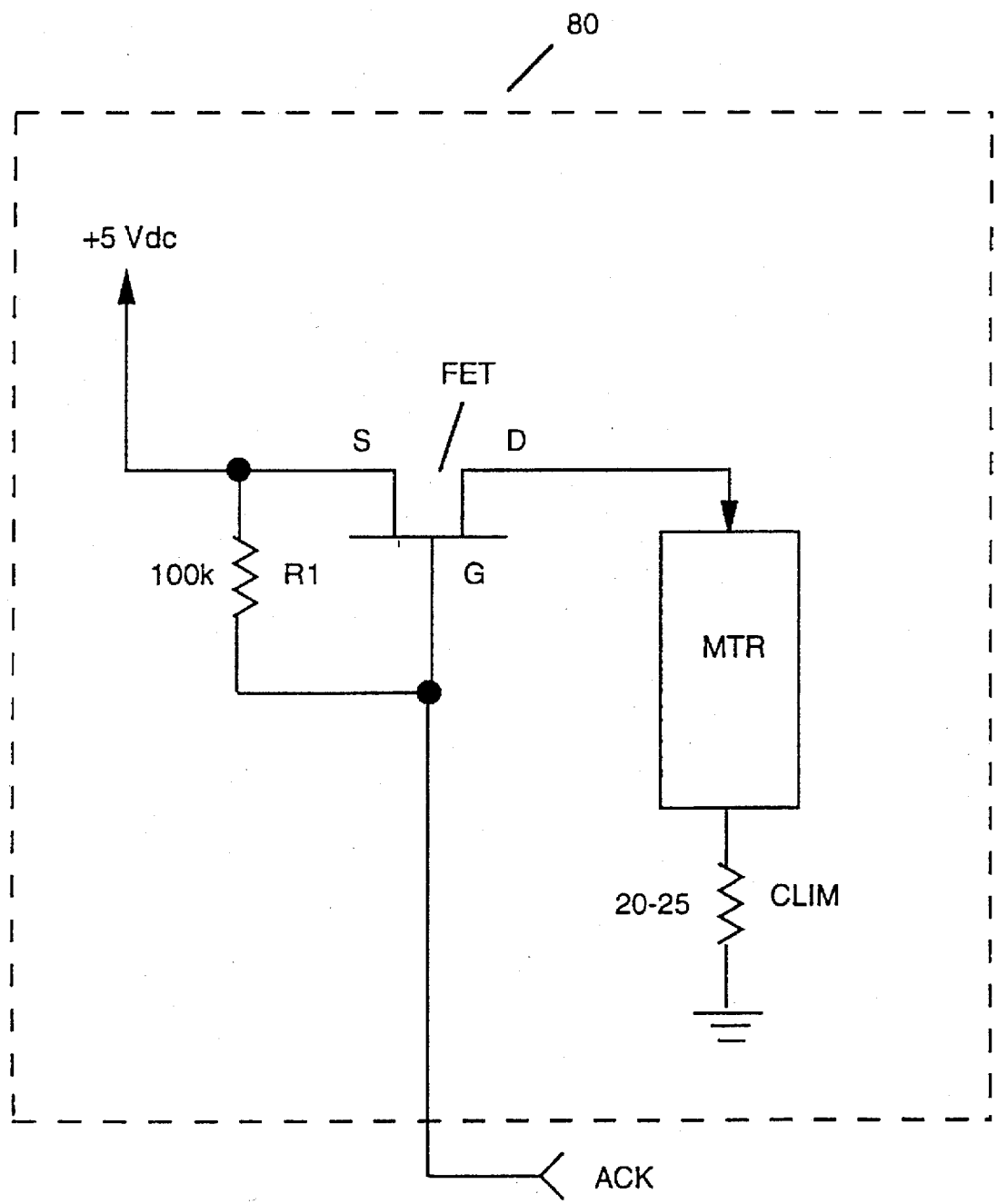
FIG. 4 illustrates a vibration circuit used in a scan gun according to a second embodiment of the invention.

A second embodiment of the invention is shown in FIG. 4. In FIG. 4, a current limiting resistor CLIM is connected in series with the vibrating motor MTR. In a similar manner to the first embodiment, a field effect transistor FET acts as a switch circuit, and receives the acknowledge line ACK from the scanning circuit 50 at the gate of the FET. The gate and source of the FET are connected together through a 100 kohm resistor R1, and the source is also connected to a high voltage potential, Vdc, shown in the second embodiment as equal to +5 volts.

Like the first embodiment, when the acknowledge line ACK is in an "active" state, the voltage at the source of the field effect transistor FET is turned ON, thereby causing the voltage at the source of the field effect transistor FET to appear at the drain of the field effect transistor FET (as well as outputting drain current).

The vibrating motor MTR has one end directly connected to the drain of the field effect transistor FET, and has another end connected to the current limiting resistor CLIM. In the second embodiment as shown in FIG. 4, the current limiting resistor CLIM has a resistance set within a range of from 20 to 25 ohms, but it can be set to any other appropriate resistance as is known to one of ordinary skill in the art for performing a current limiting function. The current limiting resistor CLIM may be of a surface mount type, or it may be mounted as a dual inline package (DIP), or any other type of mounting may be utilized for the current limiting resistor CLIM.

In either the first or second embodiments, the tactile vibration feature as described herein can be disabled by the receipt of a disable signal. This disable signal can either be manually set by the operator, such as by a vibration disable switch setting on the bar code scanner, for example, or it may be set to an "inactive state" by the scanning of a particular bar code label (from an operator's manual, for example), thereby disabling the tactile vibration function of the bar code scanner until that function is reenabled.

Given that there is typically a separate output driver for each type of "successful scan" notification, the disable signal can operate so as to only disable the tactile vibration function, or in the alternative, it can operate to disable all notification functions (i.e., light, sound and vibration).

Figure 5:
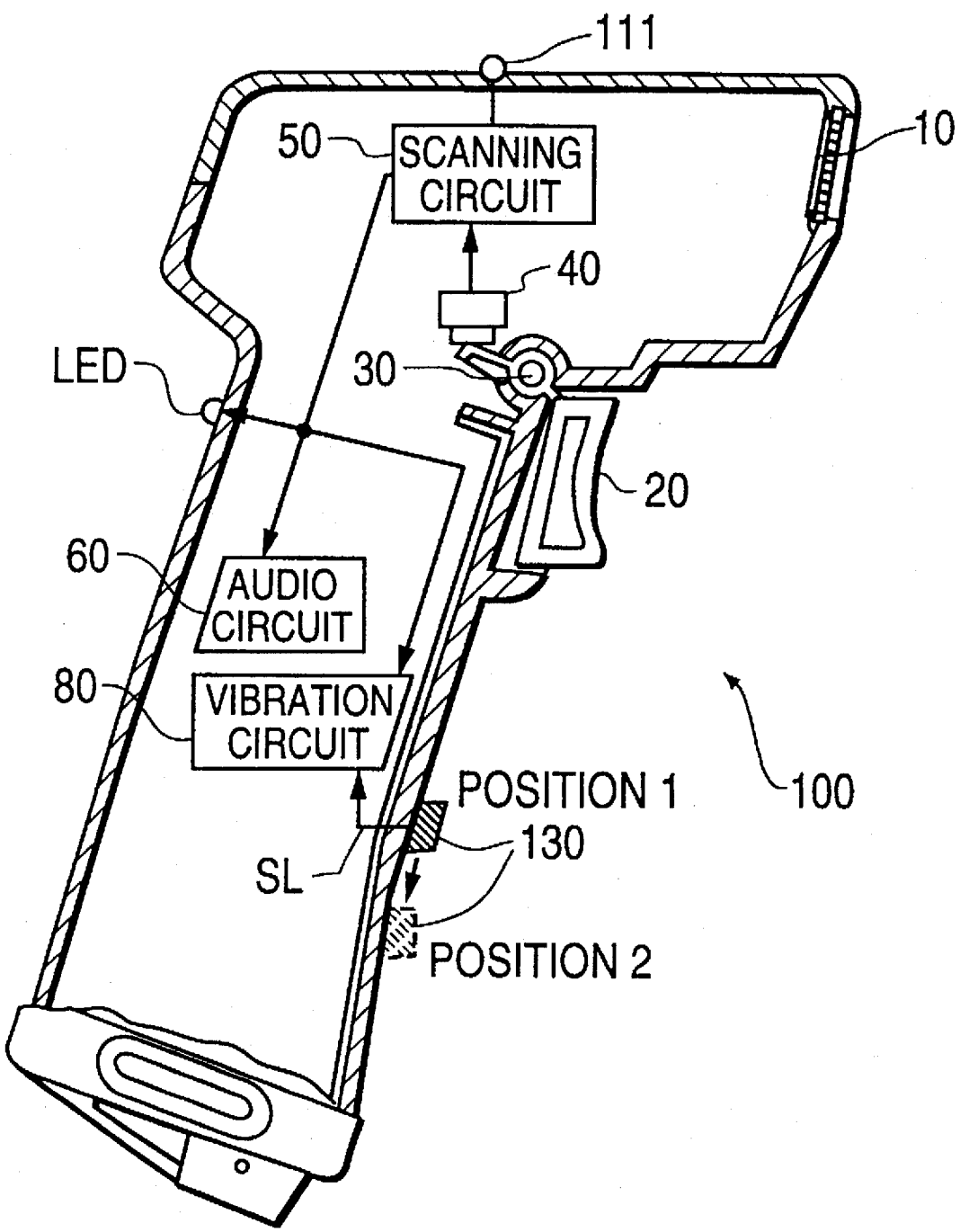
FIG. 5 illustrates a third embodiment of the invention utilizing a manual enable/disable adjustment switch.

In a third embodiment as shown in FIG. 5, a manual enable/disable switch 130 on the outer housing of the hand held scanning device can be utilized to either allow or disallow vibration of the hand held device after a successful bar code scan. The enable/disable switch 130 is shown as a two-position switch. When the enable/disable switch 130 is in the enable position, a logic "1" is output on the switch line SL, and when the enable/disable switch 130 is in the disable position, a logic "0" is output on the switch line SL.

Figure 6:
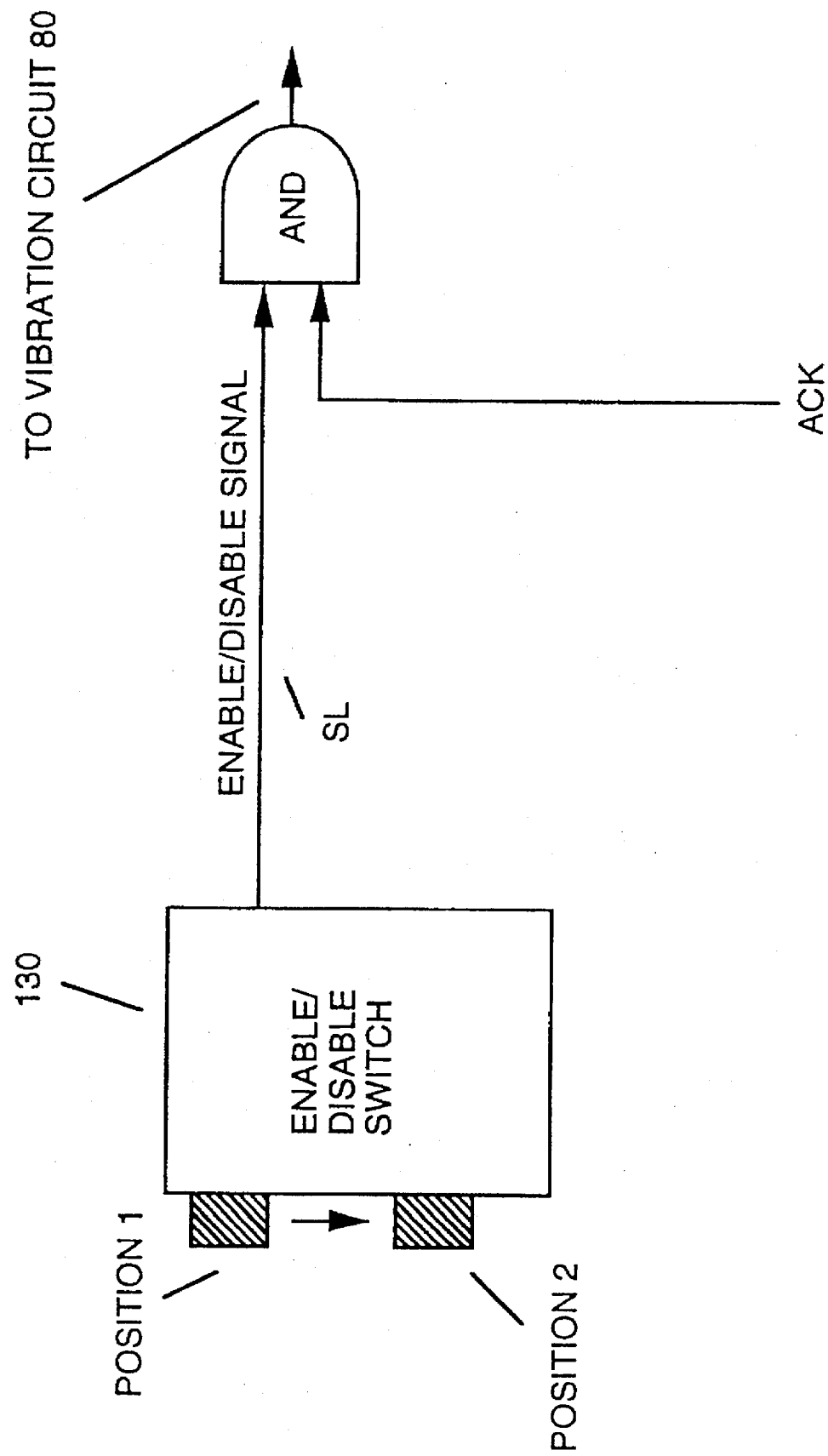
FIG. 6 illustrates a circuit for receiving an enable/disable signal from a two-position enable/disable switch and outputting an acknowledge signal according to the fourth embodiment of the invention.

As can be seen from FIG. 6, both the switch line SL and the acknowledge line ACK are input to a two-input AND gate. By this approach, the AND gate outputs a logic "0" when the enable/disable switch 130 is in the disable state, thereby not allowing the hand held scanning device to vibrate under any condition. When the enable/disable switch 130 is in the enable state (logic "1"), the acknowledge high signal (logic "1") from the scanning circuit 50 is passed unmodified to the vibration circuit 80.

Figure 7:
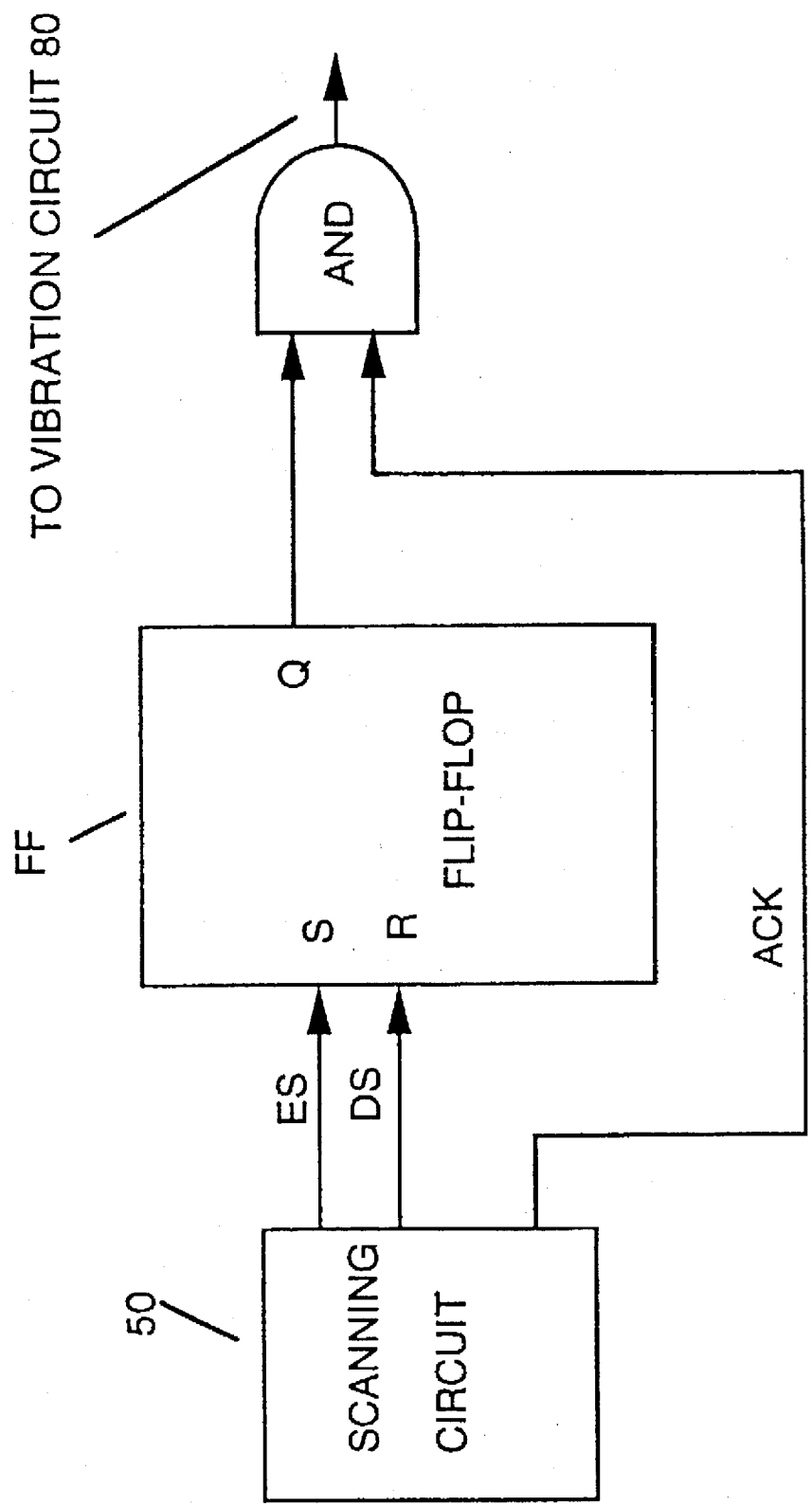
FIG. 7 illustrates a circuit for separately receiving an enable signal and a disable signal and outputting an acknowledge signal according to the invention.

FIG. 7 shows the circuitry used when an enable signal ES and a disable signal DS are received from the scanning circuit 50 along with the acknowledge line ACK. In FIG. 7, both the enable signal ES and the disable signal DS are separately received by a Set-Reset (SR) flip-flop FF. The enable signal ES and the disable signal DS can be set to a particular state by scanning special enable and disable bar codes. These special bar codes may be read from an operator's manual, for instance, or by other methods as known by one of ordinary skill in the art and still be within the teachings of the invention as described herein.

The enable signal ES is input to the Set input S of the flip-flop FF, and the disable signal DS is input to the Reset input R of the flip-flop FF. The Q output of the flip-flop FF is fed to one input of art AND gate, and the other input of the AND gate received the acknowledge line ACK. In this manner, when the disable signal DS is activated, the flip-flop FF always outputs a zero, and so the AND gate always outputs a zero no matter what state the acknowledge line ACK is in. When the enable signal ES is activated, then the Q output of the flip-flop FF outputs a one, and so the AND gate outputs the state of the acknowledge line ACK. Other methods of creating a tactile vibration signal using an enable, disable, and acknowledge signal may be utilized as is known to those of ordinary skill in the art and still keep within the teachings of the invention.

Figure 8:
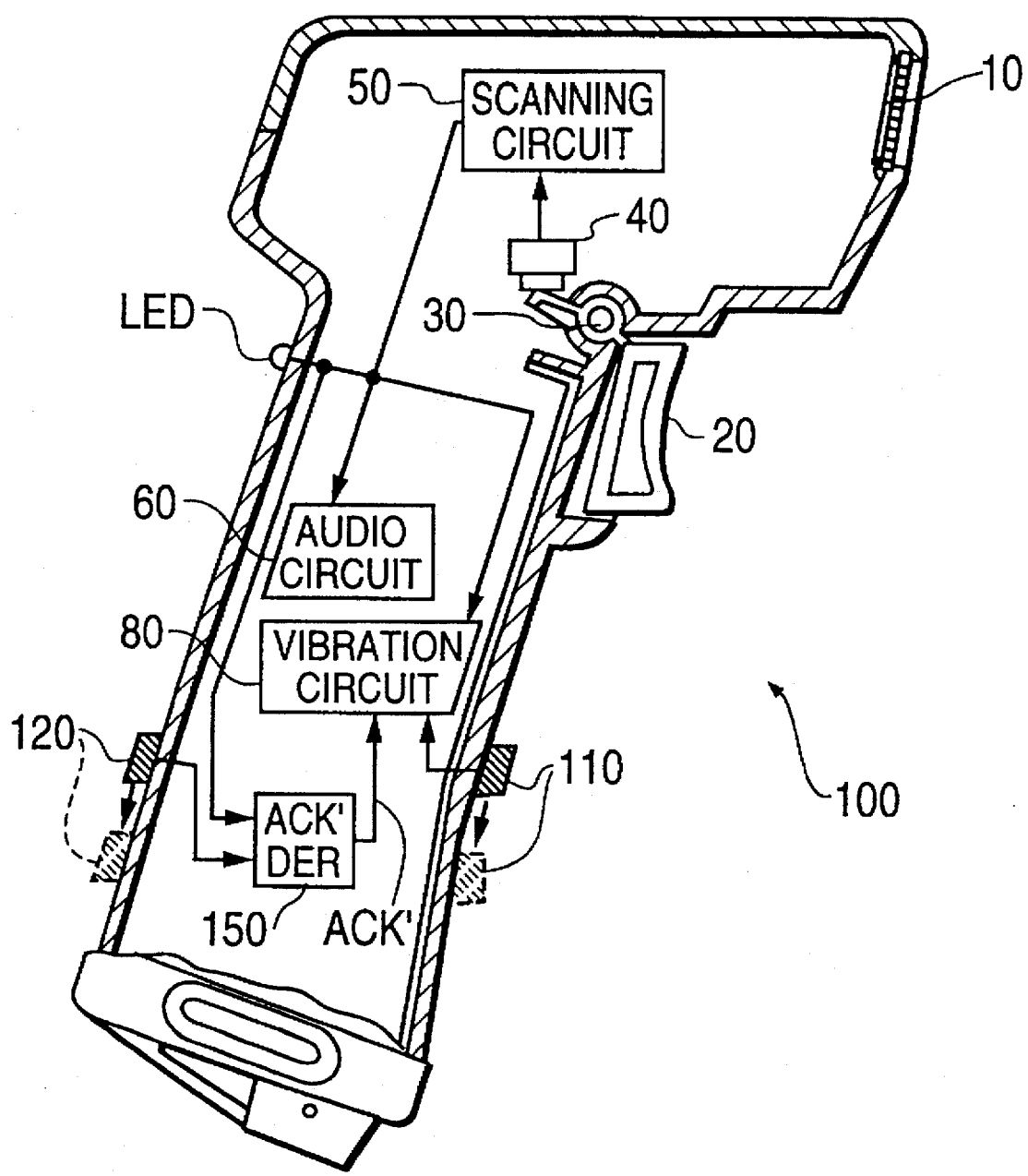
FIG. 8 illustrates the fourth embodiment of the invention utilizing a manual vibration duration switch and a manual vibration intensity switch.

In any of the embodiments described hereinabove, a feature can be added to adjust the magnitude of the vibration. Referring now to FIG. 8, there is shown a vibration magnitude adjustment switch 110 on the outer housing of the scanning device. This vibration magnitude adjustment switch 110 outputs a vibration adjustment signal that is used by the vibration circuit 80 to apply an appropriate magnitude of the tactile vibration. For the first embodiment as shown in FIG. 3, the vibration adjustment signal would change the resistance of the variable resistor RVAR, thereby adjusting the amount of output voltage Vout from the voltage regulator VREG. In this embodiment, the vibrating motor MTR outputs a level of vibration according to the amount of input voltage it receives, and so the desired amount of vibration can be effected by directly connecting the vibration magnitude adjustment switch 110 to a resistance setting input of the variable resistor RVAR.

Moreover, the length of time of the vibration may be adjustable in all of the four embodiments described hereinabove. For example, referring again to FIG. 8, there is shown a vibration duration switch 120 on the outer housing of the hand held scanning device 100. The vibration duration switch 120 allows the operator to manually set a vibration duration of somewhere between a minimum value (i.e., 0 seconds) and a maximum value (i.e., 3 seconds). In this instance, the vibration duration switch 120 outputs a time duration signal which is used together with the acknowledge signal output from the scanning circuit 50 to create an ACK' signal that is input to the vibration circuit 80, wherein the ACK' signal has a pulsewidth in accordance with the time duration of the desired vibration. The ACK' derivation circuit 150 is shown in FIG. 8, wherein it receives both the time duration signal from the vibration duration switch 120 and the acknowledge signal from the scanning circuit 50, and outputs the ACK' signal to the vibration circuit 80.

For example, the time duration signal output from the vibration duration switch 120 can be a pulse duration modulated signal (PDM), with the position of the pulse directly related to the amount of time the operator desires the vibration to last each time there is a successful scan. Other methods of providing the ACK' signal to the vibration circuit 80 with an active state in accordance with a vibration time duration can be envisioned by one of ordinary skill in the art and still be within the teachings of the invention, such as incorporating a multivibrator in the ACK' derivation circuit 150, for example.

In still another example, the time duration of the vibration could also be enabled during a successful scan for as long as the operator holds the mechanical trigger 20 in a depressed position, whereby the hand held scanning device 100 will stop vibrating when the mechanical trigger is released by the operator.

Figure 9:
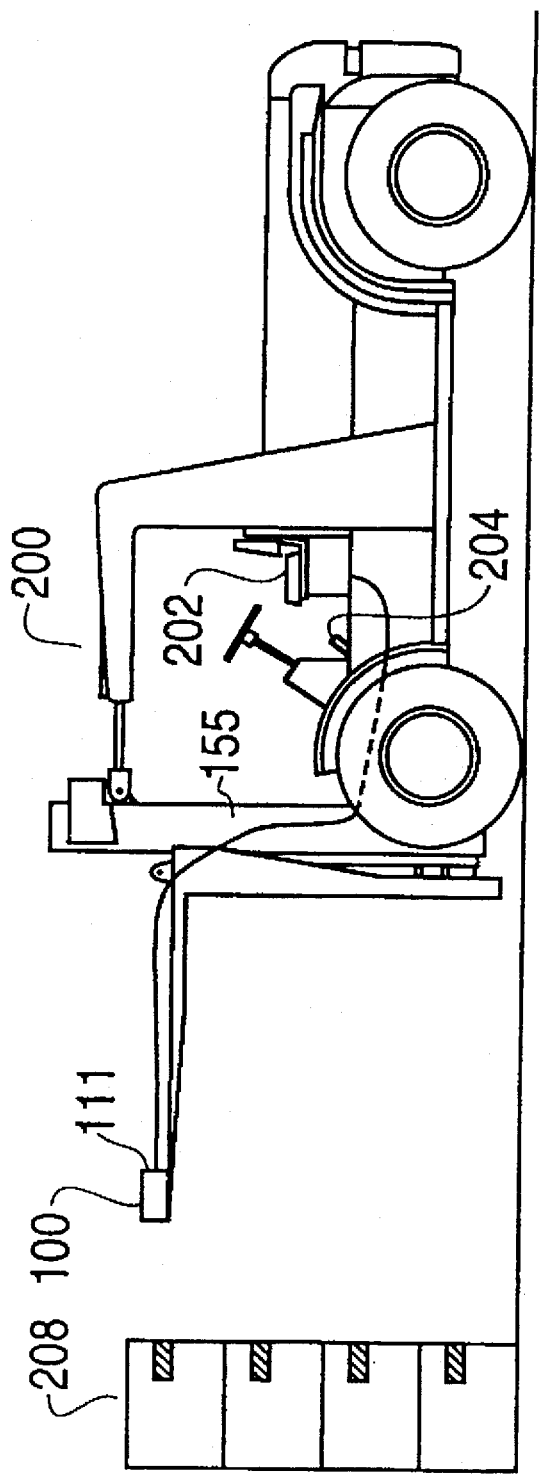
FIG. 9 illustrates an example of an external vibration circuit used with the scanner according to the invention.

Referring back to FIG. 5, there is also shown an external jack 111 extending through the housing of the scanner 100. The scanning circuit 50 outputs the acknowledge signal ACK to the external jack 111 as well as to the vibration circuit 80. That way, an external vibration circuit can be hooked up to vibrate upon reception of the ACK signal from the external jack 111 of the scanner 100. FIG. 9 shows a scanner 100 connected via an electrical cable 155 to a seat cushion 202 attached to a forklift 200. The cable 155 is connected between the external jack 111 on the scanner 100 and an external jack (not shown) on the seat cushion 202. Inside the seat cushion 202 there is a vibration circuit 80' (not shown), which causes a vibration to be felt by the operator due to the seat vibrating when a successful scan occurs. That way, an operator who is not close to the scanner 100 can be made aware of a successful scan, and thereby move on to scan each of the boxes 208 stored in the warehouse (or it can be used to indicate a proper height that the forklift 200 should be positioned at). This feature would be most desirable in cases where the operator is wearing a heavy protective suit (i.e., Kevlar suit), so that the vibrating cushion 202 would be one of the only viable ways of notifying the operator of a successful scan in a brightly lit, noisy warehouse environment. Alternatively, the external vibrating circuit 80' could be placed inside the foot pedal 204 of the forklift 200, thereby causing a vibration to the foot off the operator when a successful scan occurs.

Although FIG. 9 shows an electrical cable 155 connected between the external jack 111 of the scanner 100 and the external vibration circuit 80', the external vibration circuit 80' can be configured to vibrate upon reception of a particular frequency received over-the-air from the external jack 111 of the scanner 100. In this over-the-air configuration, there is no need for a direct physical connection between the external vibration circuit 80' and the scanner 100.

Other configurations of the invention can be envisioned by one of ordinary skill in the art and still keep within the teachings of the invention. For example, although all of the embodiments described above cause a vibration to occur after a successful scan, the opposite approach could work equally as well. That is, the scanner 100 can be configured to vibrate at all times except when the ACK signal is output from the scanning circuit 50 of the scanner 100. In this case, the absence of a vibration notifies the operator that he or she may proceed to scan the next device.

Alternatively, the scanner 100 according to the invention can be configured to only vibrate upon an unsuccessful scan, whereby an unsuccessful scan signal (not shown) output from the scanning circuit 50 would be input to the vibration circuit 80, to thereby trigger the tactile vibration of the scanner 100.

Although all of the embodiments described above involve a tactile "vibration", any type of tactile notification may be utilized and still be within the scope of the invention. For example, referring back to FIG. 2, the scanning circuit 80 may be configured to output a signal to an actuator (not shown). The actuator would be connected to the trigger 20, and would cause the trigger 20 to be positioned at a fully open state, thereby giving a tactile notification (but not a vibration) to the operator. Other types of non-vibratory tactile notifications may be apparent to those of ordinary skill in the art and still be within the scope of the invention.

While embodiments of the invention have been described herein, modifications of the described embodiments may become apparent to those of ordinary skill in the art, following the teachings of the invention, without departing from the scope of the invention as set forth in the appended claims.

What is claimed is:

1. A tactile vibration scanning system, comprising:
    a scanner, which includes:
        a housing unit;
        a scanning device contained in said housing unit and operable for scanning an object;
        means for generating a signal when said scanning device has successfully scanned said object; and
        an external port mounted on said housing unit and coupled to said generating means, said external port configured to output said signal; and
    means external to said scanner for creating a tactile vibration in response to said signal output from said external port of said scanner.

2. The scanner of claim 1, wherein said means external to said scanner for creating a tactile vibration receives said signal over an electrical connection to said external port of said scanner.

3. The scanner of claim 1, wherein said means external to said scanner for creating a tactile vibration receives said signal over the air from said external port of said scanner.

* * * * *